(12) United States Patent
Sun et al.

(10) Patent No.: US 12,154,263 B2
(45) Date of Patent: Nov. 26, 2024

(54) METHOD, APPARATUS, AND DEVICE FOR LABELING IMAGES

(71) Applicant: HON HAI PRECISION INDUSTRY CO., LTD., New Taipei (TW)

(72) Inventors: Guo-Chin Sun, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 360 days.

(21) Appl. No.: 17/585,813

(22) Filed: Jan. 27, 2022

(65) Prior Publication Data

US 2022/0253996 A1 Aug. 11, 2022

(30) Foreign Application Priority Data

Feb. 9, 2021 (CN) .......................... 202110183358.2

(51) Int. Cl.
*G06T 7/00* (2017.01)
*G06F 18/214* (2023.01)
*G06F 18/24* (2023.01)
*G06T 7/136* (2017.01)
*G06T 7/187* (2017.01)
*G06T 7/70* (2017.01)

(Continued)

(52) U.S. Cl.
CPC .............. *G06T 7/001* (2013.01); *G06F 18/24* (2023.01); *G06T 7/136* (2017.01); *G06T 7/187* (2017.01); *G06T 7/70* (2017.01); *G06V 10/82* (2022.01); *G06F 18/214* (2023.01); *G06T 2207/20081* (2013.01); *G06T 2207/20084* (2013.01); *G06T 2207/30141* (2013.01); *G06V 10/44* (2022.01)

(58) Field of Classification Search
CPC ......... G06T 7/001; G06T 7/136; G06T 7/187; G06T 7/70; G06T 2207/30141; G06T 2207/20081; G06T 2207/20084; G06V 10/44; G06V 10/759; G06V 10/82; G06V 2201/06; G06F 18/24; G06F 18/214
See application file for complete search history.

(56) References Cited

U.S. PATENT DOCUMENTS

2005/0196032 A1* 9/2005 Nedivi .................... G06T 7/001
382/149
2007/0081712 A1* 4/2007 Huang .................... G06T 7/155
382/128

(Continued)

*Primary Examiner* — Amandeep Saini
*Assistant Examiner* — Daniella M. DiGuglielmo
(74) *Attorney, Agent, or Firm* — ScienBiziP, P.C.

(57) ABSTRACT

A method, apparatus, and device for labeling images of PCBs includes obtaining an image to be tested; comparing the image to be tested to a reference image to generate an image mask, the image mask includes several connected domains; detecting defects of the image to be tested; when at least one defect is detected in the image to be tested, obtaining a coordinate of the at least one defect; based on a central coordinate of the connected domains and the coordinate of the at least one defect, determining the connected domains to be defect connected domains or normal connected domains; generating a first image mask and a second image mask; and processing the first image mask and the second image mask with the image to be tested to obtain a defect element image corresponding to the defect connected domains and a normal element image corresponding to the normal connected domains.

19 Claims, 8 Drawing Sheets

(51) Int. Cl.
*G06V 10/44* (2022.01)
*G06V 10/82* (2022.01)

(56) References Cited

U.S. PATENT DOCUMENTS

2008/0101686 A1\* 5/2008 Sali ................. G01N 21/95607
382/149
2020/0380899 A1\* 12/2020 Wen ...................... G06T 7/0008

\* cited by examiner

METHOD, APPARATUS, AND DEVICE FOR LABELING IMAGES

CROSS-REFERENCE TO RELATED APPLICATIONS

This application claims priority to Chinese Patent Application No. 202110183358.2 filed on Feb. 9, 2021, the contents of which are incorporated by reference herein.

FIELD

The subject matter herein generally relates to data labeling technology, and particularly to a method, an apparatus, and a device for labeling images.

BACKGROUND

Surface mounted technology (SMT) is precise and complicated in relation to printed circuit boards (PCB), and different defects in the PCB can occur during the manufacturing. Images of PCBs showing defects and images of normal (defect-free) PCBs need to be gathered, as negative and positive samples respectively, during a neural network training process. Thus, for PCBs in different categories, if labeling the image of the PCB is done manually, a great deal of manpower and time may be spent.

SUMMARY OF THE INVENTION

The present disclosure provides a method, an apparatus, and a device for labeling images for solving the above-mentioned problem. The method, apparatus, and device for labeling images of PCBs includes obtaining an image to be tested; comparing the image to be tested to a reference image to generate an image mask, the image mask includes several connected domains; detecting defects of the image to be tested; when at least one defect is detected in the image to be tested, obtaining a coordinate of the at least one defect; based on a central coordinate of the connected domains and the coordinate of the at least one defect, determining the connected domains to be defect connected domains or normal connected domains; generating a first image mask and a second image mask; and processing the first image mask and the second image mask with the image to be tested to obtain a defect element image corresponding to the defect connected domains and a normal element image corresponding to the normal connected domains. The method, apparatus, and device for labeling images of the present disclosure, combined with image mask and defect detection algorithms, which can automatically obtain and mark the image of normal components and the image of defect components, effectively reducing the labor cost when data labeling.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Figure 1:
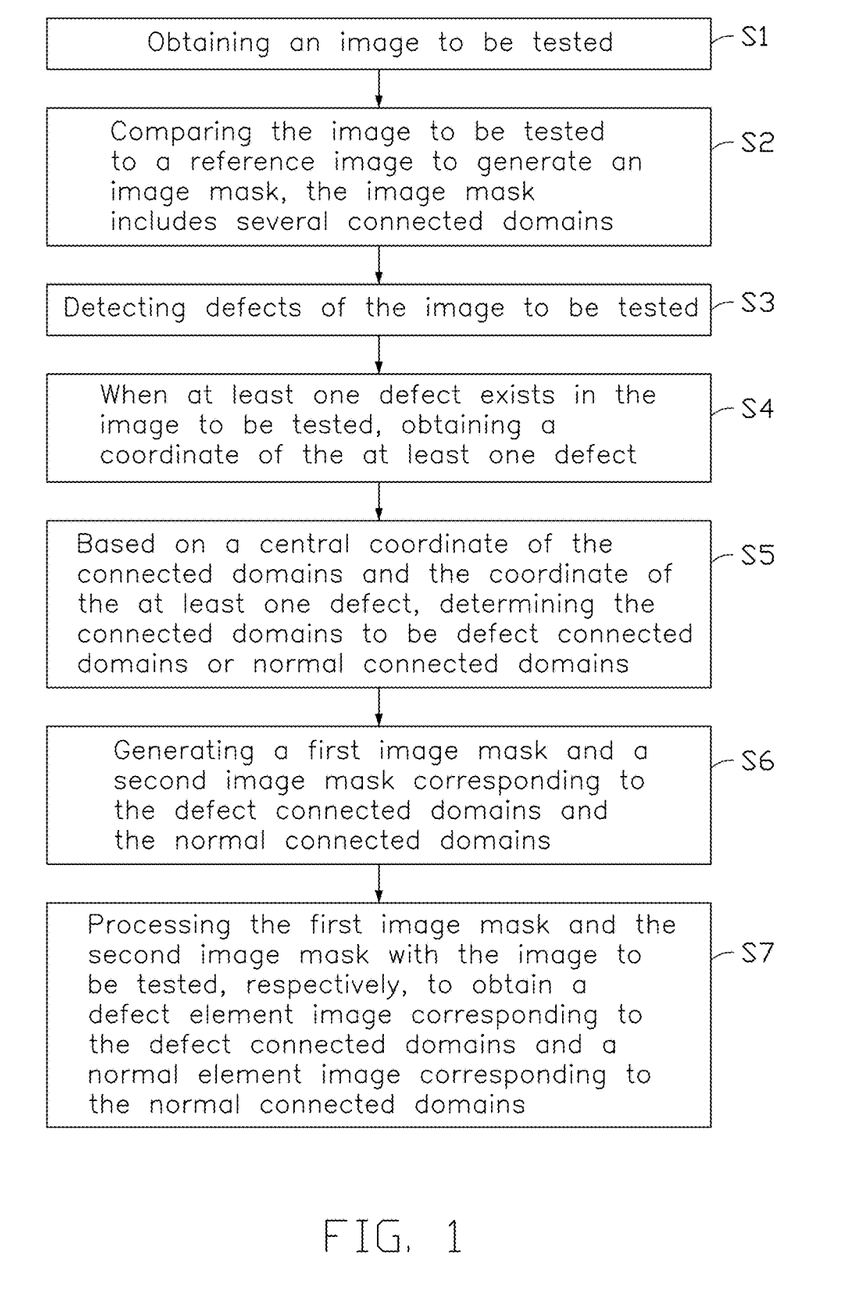
FIG. 1 illustrates a flowchart of at least one embodiment of a method for labeling images.

FIG. 1 illustrate at least one embodiment of a method for identifying and labeling images of printed circuit boards (PCBs) manufactured for SMT purposes, and which reveal defects in the PCB (negative sample) or no defects (positive sample).

The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S1.

At block S1, obtaining an image to be tested.

At block S2, comparing the image to be tested to a reference image to generate an image mask, the image mask includes several connected domains.

Figure 2:
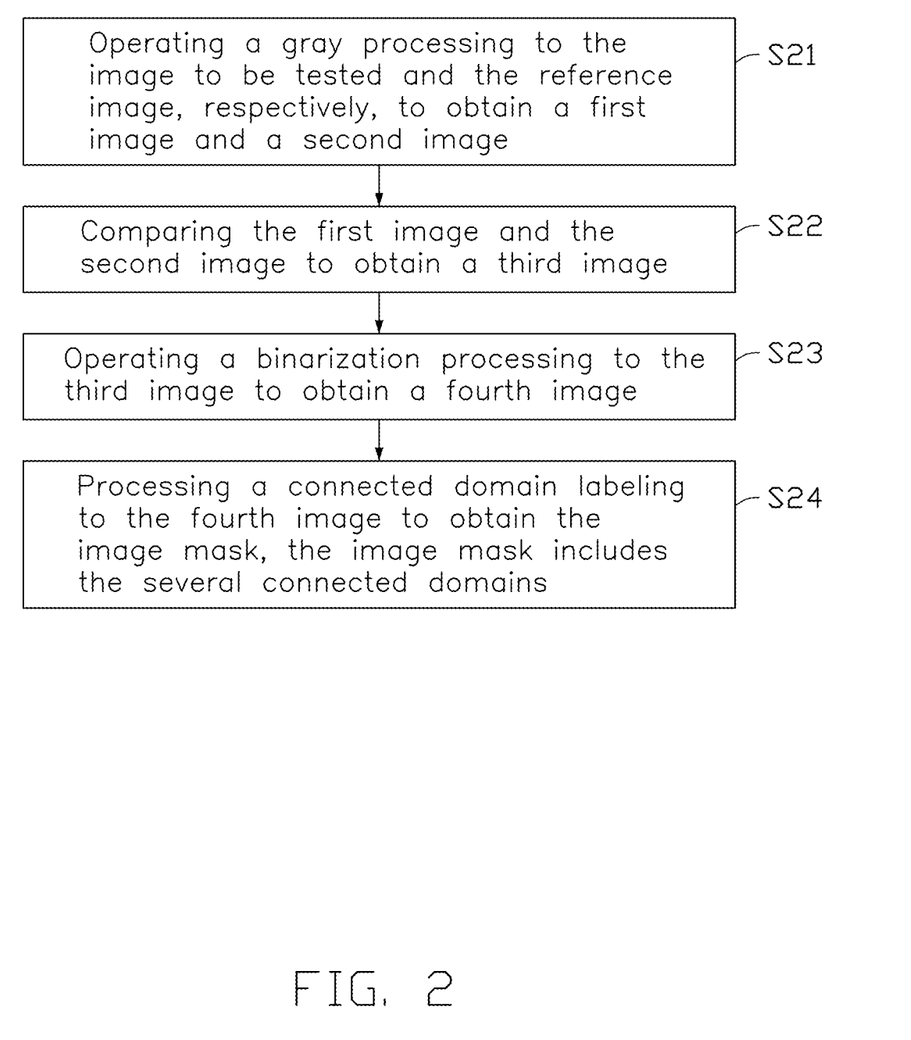
FIG. 2 illustrates a subsidiary flowchart of at least one embodiment of a block S2 of the method of FIG. 1.

As shown in FIG. 2, in at least one embodiment, the block S2 further includes:

At block S21, operating a grayscale processing to the image to be tested and the reference image, respectively, to obtain a first image and a second image.

At block S22, comparing the first image and the second image to obtain a third image.

At block S23, operating a binarization processing to the third image to obtain a fourth image, At block S24, processing a connected domain labeling to the fourth image to obtain the image mask, the image mask includes the several connected domains.

In at least one embodiment, in block S21, the grayscale processing means converting the reference image and the image to be tested to grayscale images with one pixel value in each pixel.

In at least one embodiment, in block S22, calculating a mean-square error (MSE) of the first image and the second image or calculating a structural similarity (SSIM) index of the first image and the second image, to obtain the third image.

In at least one embodiment, block S23 may further include:
  obtaining a threshold value;
  setting grayscale values of the pixels in the third image that are greater than or equal to the threshold value as a first pixel value, and setting grayscale values of the pixels in the third image that are smaller than the threshold value as a second pixel value, so as to obtain the fourth image.

The threshold value is not limited by the present disclosure, for instance, the threshold value in block S23 may be a global threshold value or a self-adapting threshold value. Different threshold values may be selected according to different binarization algorithms by a person having ordinary skill in the art.

In at least one embodiment, the connected domain in block S24 means an image area formed by neighboring pixels with a same pixel value in the fourth image. The connected domains labeling means labeling every connected domain in the fourth image and recording all coordinate values corresponding to every labeling value.

In at least one embodiment, pixel values of the pixels in the several connected domains of the image mask may be the first pixel value. The pixel values of the pixels beyond the several connected domains of the image mask may be the second pixel value.

In at least one embodiment, in block S23, the first pixel value may be 1, the second pixel value may be 0.

In at least one embodiment, in block S24, there may be several connected domains labeling algorithms, which is not limited by the present disclosure. For instance, the connected domains labeling algorithm may be a connected domains labeling algorithm based on route or based on profile. In at least one embodiment, the connected domains labeling algorithm may be as used in prior art, further details are not given.

In at least one embodiment, the image to be tested includes an image having a printed circuit board assembly (PCBA) with electronic components. The reference image includes an image having a printed circuit board (PCB) without any electronic components.

In at least one embodiment, each of the connected domains of the image mask corresponds to the electronic components.

In at least one embodiment, before block S21, pre-processing the reference image and the image to be tested.

In at least one embodiment, the pre-processing includes:
  Translating, rotating, or zooming the reference image and the image to be tested, to unify the directions of the reference image and several images to be tested;
  Adjusting the reference image and the image to be tested to standard sizes.

In at least one embodiment, the reference image, the image to be tested, the first image, the second image, the third image, the fourth image, and the image mask all have a same size.

At block S3, detecting defects of the image (detecting defects) to be tested.

In at least one embodiment, detecting defects of the image to be tested by a trained neural network model.

In at least one embodiment, detecting defects of the image to be tested may be by other ways, such as an image erosion and/or image dilating algorithm, which is not limited by the present disclosure.

At block S4, when at least one defect is revealed in the image to be tested, obtaining a coordinate of the at least one defect.

At block S5, based on a central coordinate of the connected domains and the coordinate of the at least one defect, determining the connected domains to be defect connected domains or normal connected domains.

Figure 3:
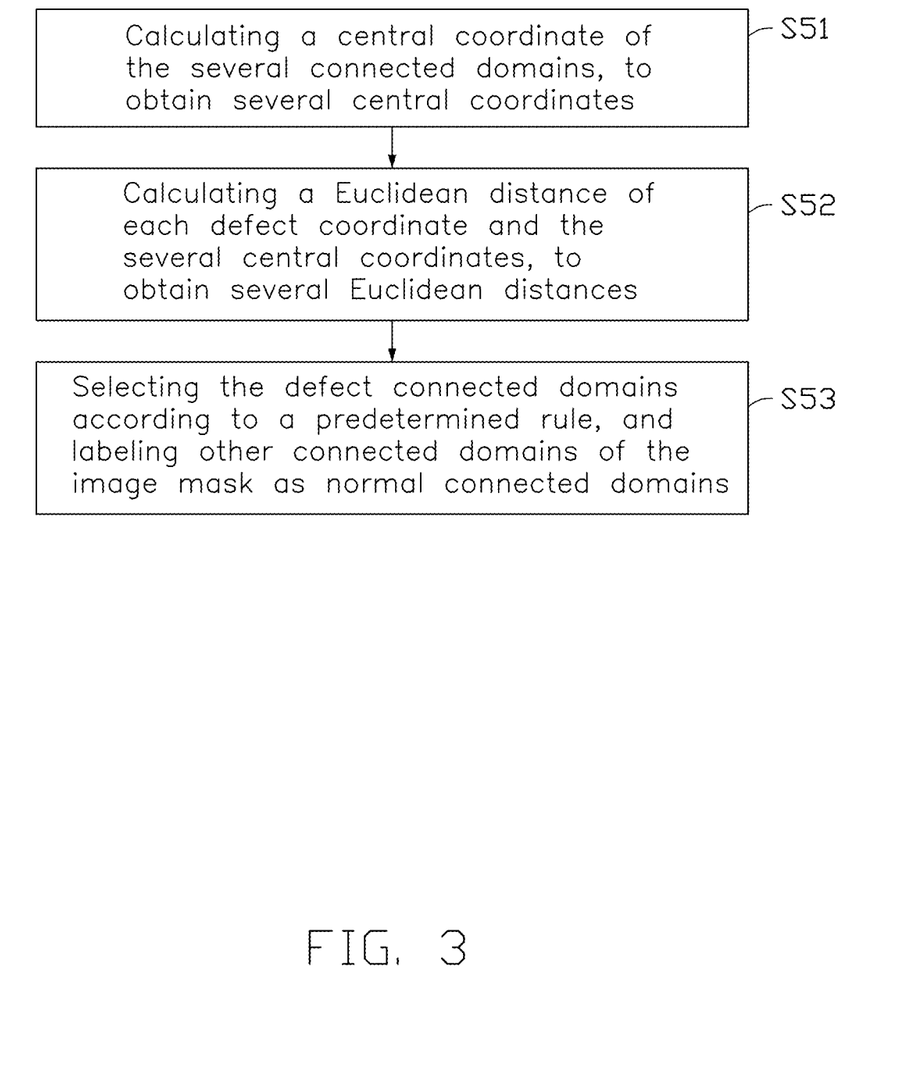
FIG. 3 illustrates a subsidiary flowchart of at least one embodiment of a block S5 of the method of FIG. 1.

As shown in FIG. 3, block S5 further includes:
At block S51, calculating a central coordinate of the several connected domains, to obtain several central coordinates;
At block S52, calculating a Euclidean distance of each defect coordinate and the several central coordinates, to obtain several Euclidean distances;
At block S53, selecting the defect connected domains according to a predetermined rule, and labeling other connected domains of the image mask as normal connected domains.

In at least one embodiment, the central coordinate may be a centroid coordinate. Thus, at block S51, several centroid coordinates may be calculated by the following centroid coordinate calculation (formula (1)):

$$X = \frac{\sum_{(i,j) \in S} i}{N}$$
$$Y = \frac{\sum_{(i,j) \in S} j}{N}$$
(1)

In formula (1), X and Y mean an abscissa coordinate and a vertical coordinate of the centroid coordinate, S means connected domain, (i,j) means a coordinate of each pixel of the connected domain, and N means a quantity of the pixel of the connected domain.

In at least one embodiment, the Euclidean distance means a real distance between two points in a multi-dimensional space. In at least one embodiment, since the image mask and the image to be tested are same size, the defect coordinate of the image to be tested and the image mask will be in a same position. Thus, at block S52, the Euclidean distance between the defect coordinate and the central coordinate means a distance between the defect coordinate and the central coordinate in the image mask. Therefore, Euclidean distances between the defect coordinate and the central coordinate of each connected domain may be calculated by the following Euclidean distance calculation (formula (2)):

$$\rho = \sqrt{(i_2-i_1)^2 - (j_2-j_1)^2} \qquad (2)$$

In formula (2), $(i_1, j_1)$ means a central coordinate of anyone of the connected domain, $(i_2, j_2)$ means a defect coordinate, and $\rho$ means a Euclidean distance between the defect coordinate and the central coordinate.

At block S53, the predetermined rule may be: selecting a minimum value from each of the several Euclidean distances, to obtain several minimum values; selecting several connected domains corresponding to the several Euclidean distances, and labeling as the defect connected domains.

Figure 4:
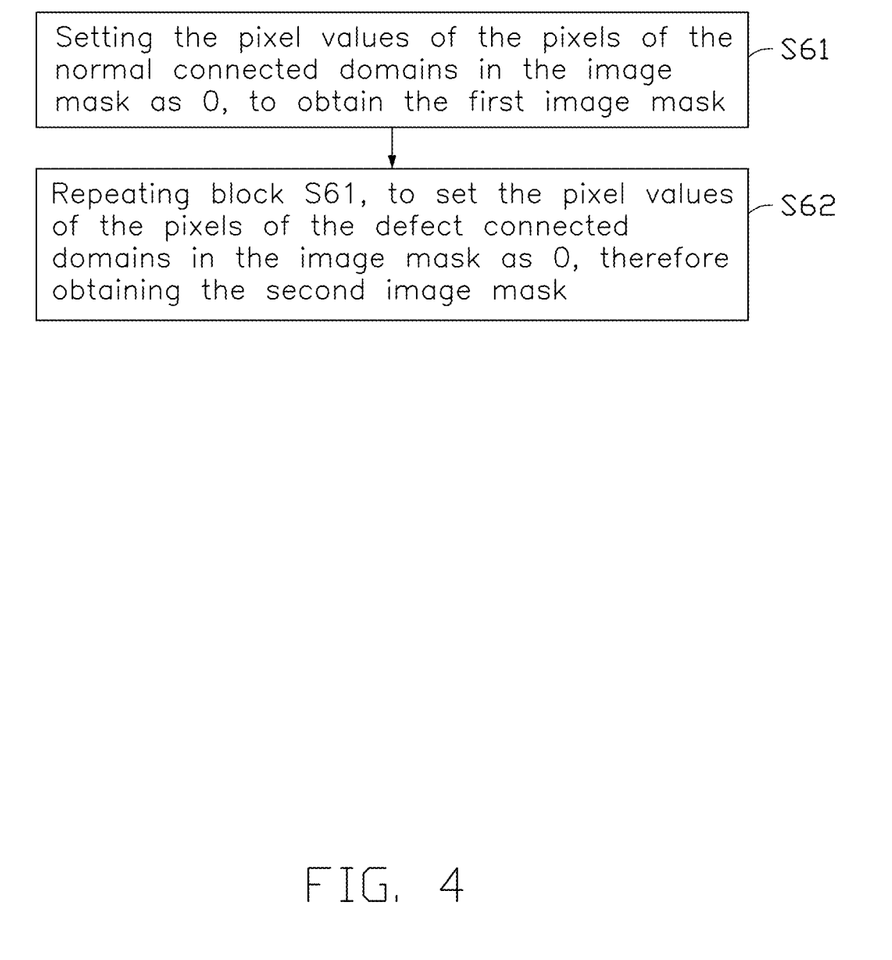
FIG. 4 illustrates a subsidiary flowchart of at least one embodiment of a block S6 of the method of FIG. 1.

At block S6, generating a first image mask and a second image mask corresponding to the defect connected domains and the normal connected domains. As shown in FIG. 4, block S6 further includes:

At block S61, setting the pixel values of the pixels of the normal connected domains in the image mask as 0, to obtain the first image mask.

At block S62, repeating block S61, to set the pixel values of the pixels of the defect connected domains in the image mask as 0, therefore obtaining the second image mask.

Figure 5:
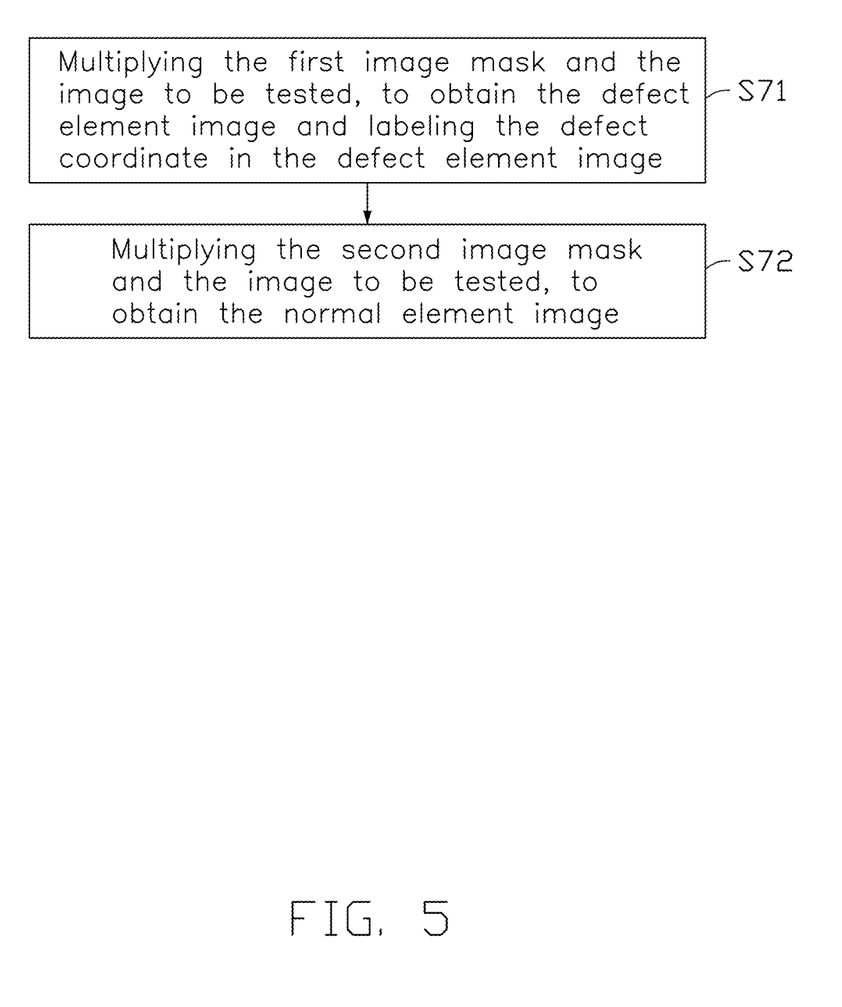
FIG. 5 illustrates a subsidiary flowchart of at least one embodiment of a block S7 of the method of FIG. 1.

At block S7, processing the first image mask and the second image mask with the image to be tested, respectively, to obtain a defect element image corresponding to the defect connected domains and a normal element image corresponding to the normal connected domains. As shown in FIG. 5, block S7 may further include:

At block S71, multiplying the first image mask and the image to be tested, to obtain the defect element image and labeling the defect coordinate in the defect element image;

At block S72, multiplying the second image mask and the image to be tested, to obtain the normal element image.

In other embodiments, when the result of detection at block S3 is that no defects are revealed in the image to be tested, that is, that the image mask is the second image mask, block S7 is processed, to obtain normal element images.

Figure 6:
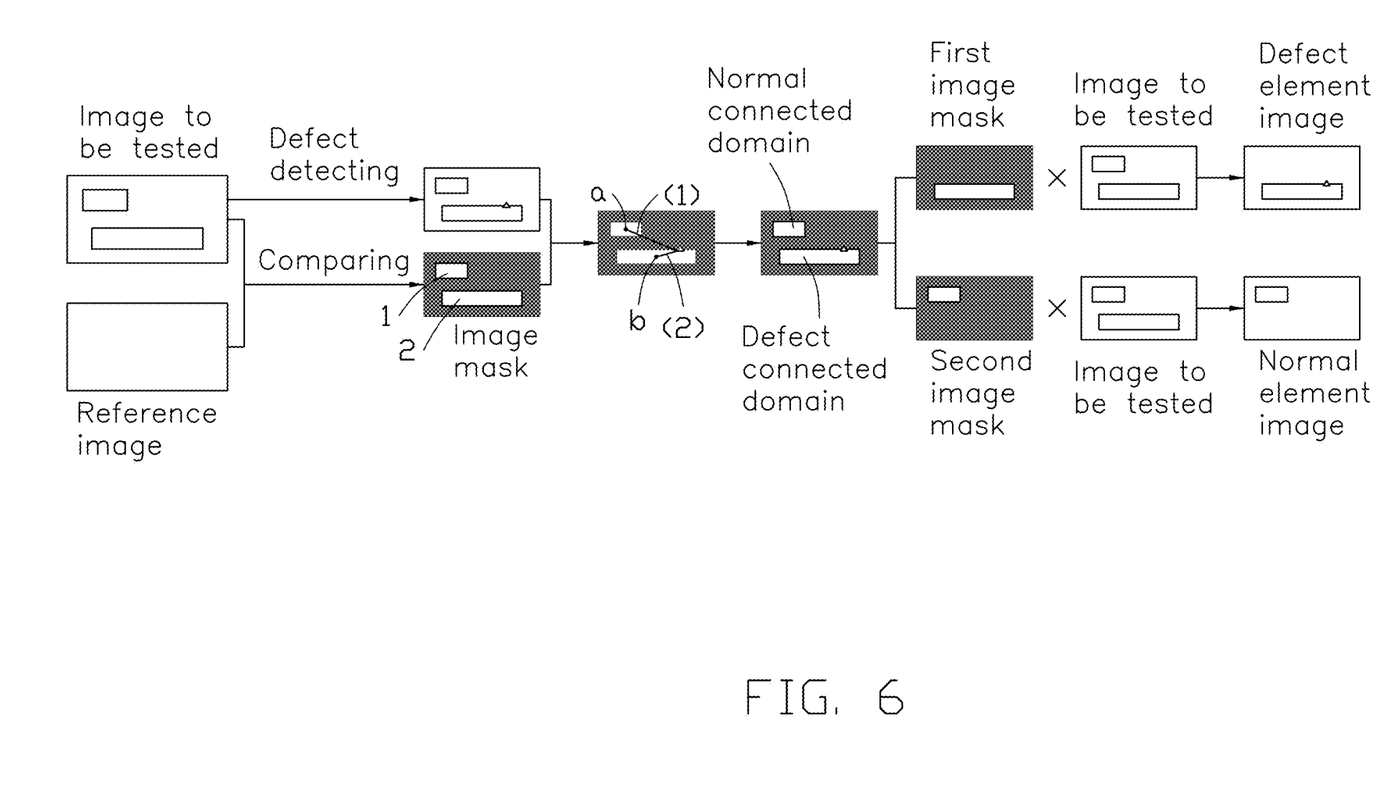
FIG. 6 shows application scenarios of at least one embodiment of the method of FIG. 1.

As shown in FIG. 6, in at least one embodiment, the image to be tested includes two electronic elements.

First of all, obtaining a reference image corresponding to an image to be tested, the image to be tested includes two electronic elements. Comparing the image to be tested and the reference image, to generate an image mask corresponding to the image to be tested. The image mask includes a connected domain 1 and a connected domain 2.

Then, detecting defects in the image to be tested, and a result of detection is that a defect (a triangle area in the figure) exists in the image to be tested, and then obtaining a defect coordinate corresponding to the defect.

Then, calculating centroid coordinates of the connected domain 1 and the connected domain 2 according to the centroid coordinate calculation formula, respectively, and recording as central coordinate a and a central coordinate b accordingly. Then calculating Euclidean distances between each of the central coordinate a and the central coordinate b and the defect coordinate, respectively, recording as a Euclidean distance (1) and a Euclidean distance (2). Comparing the Euclidean distance (1) and the Euclidean distance (2), to determine whether Euclidean distance (1) is greater than the Euclidean distance (2), that is, that the connected domain 1 is regarded as a normal connected domain, and the connected domain 2 is regarded as a defect connected domain corresponding to the defect.

Then setting the pixel values of the pixels of the normal connected domain in the image mask as 0, to obtain a first image mask; repeating this procedure to set the pixel values of the pixels of the defect connected domain in the image mask as 0, to obtain a second image mask.

Then multiplying the first image mask and the image to be tested, to obtain a defect element image and labeling the defect in the defect element image; multiplying the second image mask and the image to be tested, to obtain a normal element image.

By comparing the reference image and image to be tested, obtaining an image mask including several connected domains. When defects are revealed in the image to be tested, obtaining defect connected domains corresponding to the defects, and labeling the connected domains of the image mask besides the defect connected domains as normal connected domains. Setting pixel values of the pixels of the normal connected domains of the image mask to be 0, to obtain a first image mask; and setting pixel values of the pixels of the defect connected domains of the image mask to be 0, to obtain a second image mask. Multiplying the first image mask and the image to be tested, to obtain a defect element image; and multiplying the second image mask and the image to be tested, to obtain a normal element image. When no defects are revealed in the image to be tested, multiplying the image mask and the image to be tested, to obtain the normal element image. The method for labeling images decreases amount of human labor for labeling data.

Figure 7:
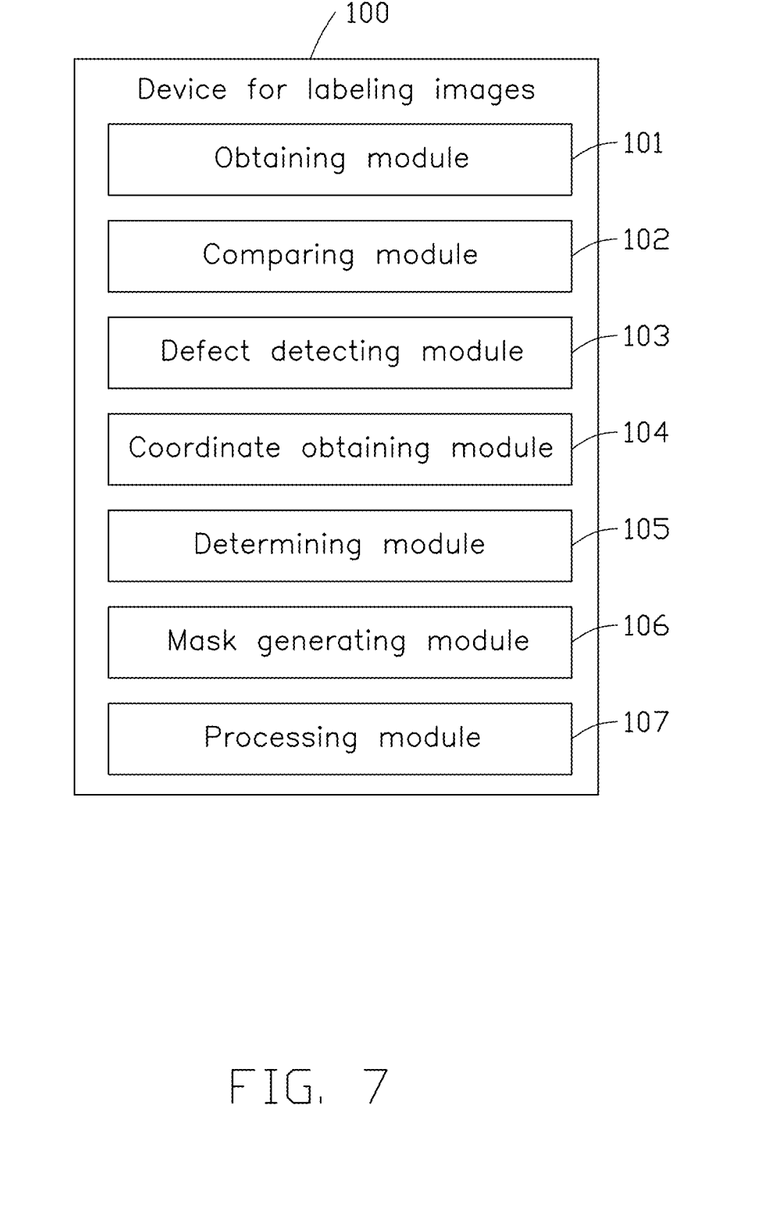
FIG. 7 illustrates a block view of at least one embodiment of a device for labeling images.

FIG. 7 illustrates at least one embodiment of a device 100 for labeling images. The device 100 for labeling images includes an obtaining module 101, a comparing module 102, a defect detecting module 103, a coordinate obtaining module 104, a determining module 105, a mask generating module 106, and a processing module 107.

The obtaining module 101 is configured to obtain an image to be tested.

The comparing module 102 is configured to compare the image to be tested to a reference image to generate an image mask, the image mask includes several connected domains.

The defect detecting module 103 is configured to detect defects revealed in the image to be tested.

The coordinate obtaining module 104 is configured to obtain a coordinate of at least one defect when a detection by the defect detecting module 103 reveals at least one defect in the image to be tested.

The determining module 105 is configured to, based on a central coordinate of the connected domain and the coordinate of the at least one defect, determine the connected domain to be a defect connected domain or a normal connected domain.

The mask generating module 106 is configured to generate a first image mask and a second image mask respectively corresponding to the defect connected domains and the normal connected domains.

The processing module 107 is configured to process the first image mask and the second image mask with the image to be tested to respectively obtain a defect element image corresponding to the defect connected domain and a normal element image corresponding to the normal connected domain.

In at least one embodiment, when the detection by the defect detecting module 103 is that no defect is revealed in the image to be tested, that is that the image mask is the second image mask, the processing module 107 is configured to process the second image mask with the image to be tested, to obtain a normal element image.

In at least one embodiment, the obtaining module 101, the comparing module 102, the defect detecting module 103, the coordinate obtaining module 104, the determining module 105, the mask generating module 106, and the processing module 107 are configured to perform blocks S1 to S7 of the method for labeling images, see above description for blocks S1 to S7.

Figure 8:
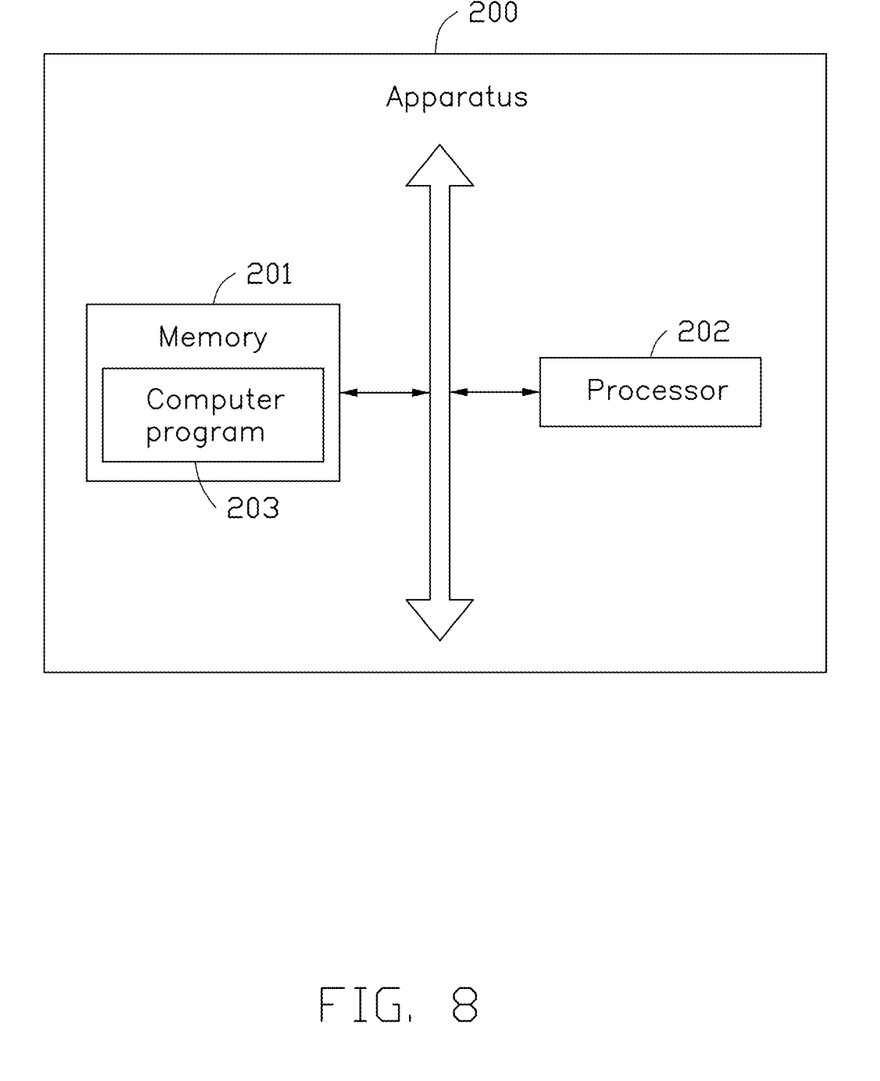
FIG. 8 illustrates a block view of at least one embodiment of an apparatus for performing the method for labeling images.

FIG. 8 illustrates an apparatus 200 including a memory 201, at least one processor 202, and a computer program 203. The computer program 203 can be stored in the memory 201 and processed by the processor 202.

The apparatus 200 may be a smart phone, a tablet computer, a laptop computer, an embedded computer, a personal computer, or a server. In at least one embodiment, the apparatus 200 may include more or less components, modules, circuits, elements, or assemblies other than the modules shown in the figures.

In at least one embodiment, the memory 201 can include various types of non-transitory computer-readable storage mediums. For example, the memory 201 can be an internal storage system, such as a flash memory, a random access memory (RAM) for the temporary storage of information, and/or a read-only memory (ROM) for permanent storage of information. The memory 201 can also be an external storage system, such as a hard disk, a storage card, or a data storage medium.

In at least one embodiment, the processor 202 can be a central processing unit (CPU), a microprocessor, a digital signal processor (DSP), an application specific integrated circuit (ASIC), a field-programmable gate array (FPGA), a data processor chip, a programmable logic device (PLD), a discrete gate/transistor logic device, or a discrete hardware component. The processor 202 may be electrically connected to other elements of the apparatus 200 through interfaces or a bus. In at least one embodiment, the apparatus 200 includes a plurality of interfaces configured to communicate with other devices or apparatus.

In at least one embodiment, the computer program 203 is configured to be processed by the processor 202 to perform the method for labeling images, such as blocks S1 to S7 of the method for labeling images. The computer program 203 may also be processed by the processor 202 to perform the functions of the modules of the device 100 for labeling images, such as the obtaining module 101, the comparing module 102, the defect detecting module 103, the coordinate obtaining module 104, the determining module 105, the mask generating module 106, and the processing module 107.

In at least one embodiment, the computer program 203 can be divided into one or more elements/modules, such as the obtaining module 101, the comparing module 102, the defect detecting module 103, the coordinate obtaining module 104, the determining module 105, the mask generating module 106, and the processing module 107 shown in FIG. 7, the one or more elements/modules are stored in the memory 201 and can be run by the at least one processor 202 to perform the method for labeling images. The one or more elements/modules can be computer program instructions describing the process of the apparatus 200 for labeling images.

In at least one embodiment, the computer program 203 can be non-transitory computer program medium integrated in the processor 202 and processed by the least one processor 202 to perform the method for labeling images shown in FIGS. 1-5.

In at least one embodiment, the computer program 203 can be an automated optical inspection (AOI) apparatus configured to detect defects of welding.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method for labeling images comprising:
obtaining an image to be tested;
comparing the image to be tested to a reference image to generate an image mask, the image mask includes several connected domains;
detecting defects of the image to be tested;
when at least one defect is detected in the image to be tested, obtaining a coordinate of the at least one defect;
based on a central coordinate of the connected domains and the coordinate of the at least one defect, determining the connected domains to be defect connected domains or normal connected domains;
generating a first image mask and a second image mask corresponding to the defect connected domains and the normal connected domains; and
processing the first image mask and the second image mask with the image to be tested, respectively, to obtain a defect element image corresponding to the defect connected domains and a normal element image corresponding to the normal connected domains.

2. The method according to claim 1, wherein the comparing the image to be tested to the reference image to generate the image mask, the image mask includes the several connected domains further comprises:
operating a grayscale processing to the image to be tested and the reference image, respectively, to obtain a first image and a second image;
comparing the first image and the second image to obtain a third image;
operating a binarization processing to the third image to obtain a fourth image; and
processing a connected domain labeling to the fourth image to obtain the image mask, the image mask includes the several connected domains.

3. The method according to claim 2, wherein calculating a mean-square error (MSE) of the first image and the second image or calculating a structural similarity (SSIM) index of the first image and the second image, to obtain the third image.

4. The method according to claim 1, wherein based on the central coordinate of the connected domains and the coordinate of the at least one defect, determining the connected domains to be defect connected domains or normal connected domains further comprises:
calculating the central coordinate of the several connected domains, to obtain several central coordinates;
calculating a Euclidean distance of the coordinate of the at least one defect and the several central coordinates, to obtain several Euclidean distances; and
selecting the defect connected domains according to a predetermined rule, and labeling other connected domains of the image mask as the normal connected domains.

5. The method according to claim 4, wherein the central coordinate is a centroid coordinate of the connected domains.

6. The method according to claim 4, wherein the predetermined rule is selecting a minimum value from each of the several Euclidean distances wherein the central coordinate is a centroid coordinate of the connected domains, to obtain several minimum values; selecting the several connected domains corresponding to the several Euclidean distances, and labeling as the defect connected domains.

7. The method according to claim 1, wherein the generating the first image mask and the second image mask corresponding to the defect connected domains and the normal connected domains further comprises:

setting pixel values of pixels of the normal connected domains in the image mask as 0, to obtain the first image mask; and repeating the procedure of setting pixel values of pixels of the normal connected domains in the image mask as 0, to set pixel values of pixels of the defect connected domains in the image mask as 0, therefore obtaining the second image mask.

8. The method according to claim 1, wherein the processing the first image mask and the second image mask with the image to be tested, respectively, to obtain the defect element image corresponding to the defect connected domains and the normal element image corresponding to the normal connected domains further comprises:

multiplying the first image mask and the image to be tested, to obtain the defect element image and labeling the coordinate of the at least one defect in the defect element image; and multiplying the second image mask and the image to be tested, to obtain the normal element image.

9. The method according to claim 1, wherein when no defect is detected in the image to be tested, that is the image mask is the second image mask, multiplying the image mask and the image to be tested, to obtain the normal element image.

10. An apparatus for labeling images comprising:

at least one processor; and at least one memory coupled to the at least one processor and storing program instructions; the memory and the program instructions configured to, with the at least one processor, cause the apparatus to perform:

obtaining an image to be tested;

comparing the image to be tested to a reference image to generate an image mask, the image mask includes several connected domains;

detecting defects of the image to be tested;

when at least one defect is detected in the image to be tested, obtaining a coordinate of the at least one defect;

based on a central coordinate of the connected domains and the coordinate of the at least one defect, determining the connected domains to be defect connected domains or normal connected domains;

generating a first image mask and a second image mask corresponding to the defect connected domains and the normal connected domains; and processing the first image mask and the second image mask with the image to be tested, respectively, to obtain a defect element image corresponding to the defect connected domains and a normal element image corresponding to the normal connected domains.

11. The apparatus according to claim 10, wherein the comparing the image to be tested to the reference image to generate the image mask, the image mask includes several connected domains further comprises:

operating a grayscale processing to the image to be tested and the reference image, respectively, to obtain a first image and a second image;

comparing the first image and the second image to obtain a third image;

operating a binarization processing to the third image to obtain a fourth image; and processing a connected domain labeling to the fourth image to obtain the image mask, the image mask includes the several connected domains.

12. The apparatus according to claim 11, wherein calculating a mean-square error (MSE) of the first image and the second image or calculating a structural similarity (SSIM) index of the first image and the second image, to obtain the third image.

13. The apparatus according to claim 10, wherein based on the central coordinate of the connected domains and the coordinate of the at least one defect, determining the connected domains to be defect connected domains or normal connected domains further comprises:

calculating the central coordinate of the several connected domains, to obtain several central coordinates;

calculating a Euclidean distance of the coordinate of the at least one defect and the several central coordinates, to obtain several Euclidean distances; and selecting the defect connected domains according to a predetermined rule, and labeling other connected domains of the image mask as the normal connected domains.

14. The apparatus according to claim 13, wherein the central coordinate is a centroid coordinate of the connected domains.

15. The apparatus according to claim 13, wherein the predetermined rule is selecting a minimum value from each of the several Euclidean distances wherein the central coordinate is a centroid coordinate of the connected domains, to obtain several minimum values; selecting the several connected domains corresponding to the several Euclidean distances, and labeling as the defect connected domains.

16. The apparatus according to claim 10, wherein the generating the first image mask and the second image mask corresponding to the defect connected domains and the normal connected domains further comprises:

setting pixel values of pixels of the normal connected domains in the image mask as 0, to obtain the first image mask; and repeating the procedure of setting pixel values of pixels of the normal connected domains in the image mask as 0, to set pixel values of pixels of the defect connected domains in the image mask as 0, therefore obtaining the second image mask.

17. The apparatus according to claim 10, wherein the processing the first image mask and the second image mask with the image to be tested, respectively, to obtain the defect element image corresponding to the defect connected domains and the normal element image corresponding to the normal connected domains further comprises:

multiplying the first image mask and the image to be tested, to obtain the defect element image and labeling the coordinate of the at least one defect in the defect element image; and multiplying the second image mask and the image to be tested, to obtain the normal element image.

18. The apparatus according to claim 10, wherein when no defect is detected in the image to be tested, that is the image mask is the second image mask, multiplying the image mask and the image to be tested, to obtain the normal element image.

19. A device for labeling images comprising:
- an obtaining module configured to obtain an image to be tested;
- a comparing module configured to compare the image to be tested to a reference image to generate an image mask, the image mask includes several connected domains;
- a defect detecting module configured to detect defects of the image to be tested;
- a coordinate obtaining module configured to, when at least one defect is detected in the image to be tested, obtain a coordinate of the at least one defect;
- a determining module configured to, based on a central coordinate of the connected domains and the coordinate of the at least one defect, determine the connected domains to be defect connected domains or normal connected domains;
- a mask generating module configured to generate a first image mask and a second image mask corresponding to the defect connected domains and the normal connected domains; and
- a processing module configured to process the first image mask and the second image mask with the image to be tested, respectively, to obtain a defect element image corresponding to the defect connected domains and a normal element image corresponding to the normal connected domains.

* * * * *